United States Patent
Woolard et al.

(10) Patent No.: US 9,944,870 B2
(45) Date of Patent: Apr. 17, 2018

(54) DIESEL FUEL COMPOSITION

(71) Applicant: SASOL TECHNOLOGY (PTY) LTD, Johannesburg (ZA)

(72) Inventors: Christopher Woolard, Cape Town (ZA); Adrian James Velaers, Cape Town (ZA)

(73) Assignee: Sasol Technology (Pty) Ltd, Johannesburg (ZA)

( * ) Notice: Subject to any disclaimer, the term of this patent is extended or adjusted under 35 U.S.C. 154(b) by 36 days.

(21) Appl. No.: 14/438,871

(22) PCT Filed: Oct. 30, 2013

(86) PCT No.: PCT/ZA2013/000081
§ 371 (c)(1),
(2) Date: Apr. 27, 2015

(87) PCT Pub. No.: WO2014/075112
PCT Pub. Date: May 15, 2014

(65) Prior Publication Data
US 2015/0252276 A1    Sep. 10, 2015

(30) Foreign Application Priority Data

Oct. 30, 2012  (ZA) .................................. 2012/08153

(51) Int. Cl.
| | |
|---|---|
| *C10L 1/08* | (2006.01) |
| *C10L 10/08* | (2006.01) |
| *C10L 1/18* | (2006.01) |
| *C10G 3/00* | (2006.01) |
| *C10L 1/02* | (2006.01) |
| *C10G 2/00* | (2006.01) |

(52) U.S. Cl.
CPC .................. *C10L 1/08* (2013.01); *C10G 2/30* (2013.01); *C10G 3/50* (2013.01); *C10L 1/026* (2013.01); *C10L 1/18* (2013.01); *C10L 10/08* (2013.01); C10G 2300/1022 (2013.01); C10G 2300/1096 (2013.01); C10G 2300/30 (2013.01); *C10L 1/1817* (2013.01); C10L 2200/0446 (2013.01); *C10L 2200/0492* (2013.01); *C10L 2230/14* (2013.01); *C10L 2270/026* (2013.01); *Y02P 30/20* (2015.11)

(58) Field of Classification Search
USPC .......................................................... 44/385
See application file for complete search history.

(56) References Cited

U.S. PATENT DOCUMENTS

| | | | |
|---|---|---|---|
| 2,366,490 A | 1/1945 | Cloud | |
| 5,599,849 A | 2/1997 | Jager et al. | |
| 5,844,006 A | 12/1998 | Jager et al. | |
| 6,201,031 B1 | 3/2001 | Steynberg et al. | |
| 6,265,452 B1 | 7/2001 | Steynberg et al. | |
| 6,462,098 B1 | 10/2002 | Vogel et al. | |
| 7,279,018 B2 | 10/2007 | Jakkula et al. | |
| 2006/0199988 A1* | 9/2006 | Kowalik ................ | C10G 50/00 585/533 |
| 2010/0326881 A1* | 12/2010 | Lopez .................... | C10G 45/08 208/15 |
| 2016/0010020 A1* | 1/2016 | Strittmatter ........... | C10L 1/1973 44/417 |

OTHER PUBLICATIONS

BP Australia, "Long Term Storage of Diesel", Document ADF1403. doc, Issued Feb. 10, 2005, BP Australia Limited A.C.N. 004 085 616 (2005).
Dry, M.E., "Technology of the Fischer-Tropsch Process", Catal. Rev. Sci. Eng., 23 (1 & 2), 265-278 (1981).
Leedham et al., "Impact of Fuel Additives on Diesel Injector Deposits," SAE Technical Paper 2004-01-2935, (2004).

* cited by examiner

Primary Examiner — Ellen McAvoy
Assistant Examiner — Chantel Graham
(74) Attorney, Agent, or Firm — Knobbe Martens Olson & Bear, LLP

(57) ABSTRACT

The invention provides a method of reducing the propensity of a diesel fuel composition to take up zinc when exposed to zinc during storage and/or transportation, the method comprising formulating a diesel fuel composition to be stored or transported in contact with zinc such that said diesel fuel composition has an aniline point greater than 80° C.

15 Claims, 3 Drawing Sheets

DIESEL FUEL COMPOSITION

INCORPORATION BY REFERENCE TO RELATED APPLICATIONS

Any and all priority claims identified in the Application Data Sheet, or any correction thereto, are hereby incorporated by reference under 37 CFR 1.57. This application is the national phase under 35 U.S.C. § 371 of prior PCT International Application No. PCT/ZA2013/000081 which has an International Filing Date of Oct. 30, 2013, which designates the United States of America, and which claims priority to South Africa Application No. 2012/08153 filed Oct. 30, 2012. Each of the aforementioned applications is incorporated by reference herein in its entirety, and each is hereby expressly made a part of this specification.

FIELD OF THE INVENTION

The present invention relates to a method of reducing the propensity of a diesel fuel composition to take up zinc during transportation and/or storage, particularly when said diesel fuel composition is exposed to or comes into contact with a transportation or storage system which contains zinc. The present invention also relates to the use of said diesel fuel composition in a zinc-containing system, wherein the degree of zinc up-take in the diesel fuel composition from said system is reduced.

BACKGROUND OF THE INVENTION

It is well known that trace amounts of zinc dissolved in diesel fuel can rapidly accelerate injector nozzle fouling in modern common rail diesel engines. These deposits line the metal surfaces inside the very small holes of the injector nozzle, thereby reducing the fuel flow into the engine which ultimately results in a loss of engine power. According to the study by Leedham et al ("Impact of Fuel Additives on Diesel Injector Deposits," SAE Technical Paper 2004-01-2935, 2004), trace amounts of zinc (of the order of 1 ppm) in a diesel fuel composition can cause significant power loss (ca. 12%) in a common rail diesel engine when advanced injector nozzles are used.

In general, diesel fuels are known to be prone to zinc pick-up during transportation if exposed to zinc containing components. Conventional wisdom in the art is that it is preferable to avoid any contact between diesel range material and zinc containing systems (see for example, BP Document ADF1403, "Long term storage of diesel", 2005) either during storage or transportation. It is acknowledged nonetheless, that in non-ideal circumstances, it is possible that contact might occur.

It has been experimentally demonstrated that diesel fuels can pick up zinc in the market logistic system, e.g. if the fuels come into contact with galvanised pipes and fittings; or if diesel fuels to which acid-based lubricity improvers have been added are stored in zinc-containing vehicle fuel tanks. There have been inconsistencies in measurement of the extent of zinc contamination in commercial diesel fuels, largely as a result of uncertainty in the probability of zinc exposure across several studies. However, it is not disputed that the presence of zinc in a market diesel fuel composition at levels even as low as 1 ppm would cause significant injector fouling problems.

Deposit control additives (DCA) have hence been developed to effectively combat zinc-related injector fouling. Many of these additives are also very effective at dissolving the deposits from previously fouled injectors. These deposit control additives appear to act by increasing or facilitating zinc solubility in diesel fuel compositions which typically results in zinc levels in the fuel that are significantly elevated over those where no additive is used. The efficacy of these additives does mean that any potential zinc-induced injector fouling problem can be eliminated, but only if they are used routinely, which result in increased cost. The increase in dissolved zinc in the diesel fuel composition as a result of using the additives could lead to other problems, such as the diesel particulate filter (DPF) operating ineffectively.

SUMMARY OF THE INVENTION

According to a first aspect of the invention there is provided a method of reducing the propensity of a diesel fuel composition to take up zinc when exposed to zinc during storage and/or transportation, the method comprising formulating a diesel fuel composition to be stored or transported in contact with zinc such that said diesel fuel composition has an aniline point greater than 80° C.

The method may comprise formulating a diesel fuel composition having an aniline point greater than 85° C.

The method may comprise formulating a diesel fuel composition having an aniline point greater than 90° C.

The method may comprise formulating a diesel fuel composition having an aniline point greater than 95° C.

The diesel fuel composition may comprise a distillate fuel component which is highly paraffinic.

The highly paraffinic distillate fuel component may have a paraffin content of at least 70 weight %, preferably at least 80 weight % and more preferably at least 90 weight %.

The highly paraffinic distillate fuel component may have an aromatics content less than 0.1 weight percent and a sulphur content less than 10 ppm.

The formulating of the diesel fuel composition may comprise blending a highly paraffinic distillate fuel component with a second distillate fuel component in an effective amount to yield a diesel fuel composition having an aniline point greater than 80° C.

The highly paraffinic distillate fuel component may be blended with a second distillate fuel component.

The second distillate fuel component may have an aniline point of 75° C. or less.

The highly paraffinic distillate fuel component may have an aniline point greater than 80° C., preferably greater than 85° C. and more preferably greater than 90° C. and even more preferably greater than 95° C.

The highly paraffinic distillate fuel component may be derived from a Fischer Tropsch process or it may be a hydrogenated renewable diesel (HRD) or a combination of the two.

The method may further comprise adding a deposit control additive to the diesel fuel composition in an amount greater than 200 ppm, preferably greater than 350 ppm, and wherein the diesel fuel composition has a zinc content of less than 1 ppm following exposure to zinc.

According to a second aspect of the invention, there is provided use of a diesel fuel composition with an aniline point greater than 80° C. during storage and/or transportation to reduce zinc up-take.

The diesel fuel composition may have an aniline point greater than 85° C.

The diesel fuel composition may have an aniline point greater than 90° C.

The diesel fuel composition may have an aniline point greater than 95° C.

The diesel fuel composition may comprise a distillate fuel component which is highly paraffinic.

The highly paraffinic distillate fuel component may have a paraffin content of at least 70 weight %, preferably at least 80 weight % and more preferably at least 90 weight %.

The highly paraffinic distillate fuel component may have an aromatics content less than 0.1 weight percent and a sulphur content less than 10 ppm.

The highly paraffinic distillate fuel component may be derived from a Fischer Tropsch process or it may be a hydrogenated renewable diesel (HRD) or a combination of the two.

The highly paraffinic distillate fuel component may be blended with a second distillate fuel component in an effective amount to yield a diesel fuel composition having an aniline point greater than 80° C.

The highly paraffinic distillate fuel component may have an aniline point greater than 80° C., preferably greater than 85° C. and more preferably greater than 90° C. and even more preferably greater than 95° C.

The highly paraffinic distillate fuel component may be blended with a second distillate fuel component.

The second distillate fuel component may have an aniline point of 75° C. or less.

The second distillate fuel component may comprise a crude-derived distillate fraction, a bio-derived fuel fraction or a combination of the two.

The diesel fuel composition may comprise a deposit control additive in an amount greater than 200 ppm, preferably greater than 350 ppm.

The invention extends to a diesel fuel composition having an aniline point greater than 80° C., wherein the diesel fuel composition is a blend of a highly paraffinic distillate fuel component with a second distillate fuel component.

The diesel fuel composition wherein the highly paraffinic distillate fuel component may be derived from a Fischer-Tropsch process, a hydrogenated renewable diesel (HRD) or a combination of the two.

The diesel fuel composition wherein the second distillate fuel component may be a crude-derived distillate fraction, a bio-derived fuel fraction or a combination of the two.

DETAILED DESCRIPTION OF THE INVENTION

Figure 1:
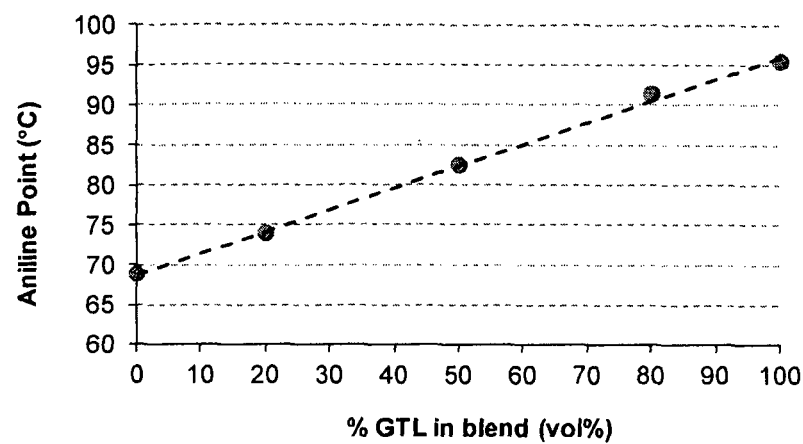
FIG. 1 shows the aniline points measured for the range of blends of Example 1.

The present invention is intended to reduce injector fouling problems that result from the up-take of zinc in a diesel fuel composition from exposure to various logistics and storage systems. In the current art, detergency additives are added to diesel fuels in order to increase zinc solubility in the fuel, thus reducing the likelihood of the zinc dropping out of the fuel and depositing on the injectors during combustion. However, detergency additives can be costly and also inevitably result in an elevated zinc concentration in the fuel (due to the increased solubility mechanism by which they operate). Ultimately this zinc must be emitted from the engine exhaust as particulate matter, and thus could have an impact on the effective operation of the diesel particulate filter (DPF).

With this invention, the inventors have found a method of minimising or eliminating the up-take of zinc by diesel fuel compositions during transportation or storage, thereby ensuring delivery of diesel fuel compositions that will not result in zinc-related injector fouling problems. It has been found, through careful choice of an appropriate fuel hydrocarbon chemistry, that it is possible to obtain a diesel fuel composition that has a reduced propensity to take up zinc when exposed to a zinc containing system that will result in less injector fouling, even with extended exposure to zinc-containing components.

It has also been found by the inventors that the zinc up-take propensity of such a diesel fuel composition is lower even in the presence of detergency additives, when compared to conventional crude derived diesel fuels to which detergency additives have been added. As increased zinc levels can have a deleterious effect on exhaust after-treatment systems, even in situations where injector fouling effects can be mitigated through the use of detergency additives, this is a desirable outcome.

Diesel fuel compositions of the invention are characterised by an elevated aniline point relative to that typically observed for conventional (crude-derived) diesel fuel. In one form of the invention, the aniline point of the diesel fuel composition is greater than 80° C., preferably it greater than 85° C., more preferably it is greater than 90° C. and even more preferably it is greater than 95° C. (For comparison purposes, crude-derived diesel such as commercial samples conforming to the EN590 specification has been determined by the inventors to have an aniline point of less than 70° C.)

In a preferred embodiment of the invention at least a portion of the diesel fuel composition has a distillate fuel component having an aniline point greater than 80° C. A distillate fuel component as used herein refers to a component which may be used on its own or which may be used with other components to form the diesel fuel composition of the invention. The diesel fuel composition may further comprise a second distillate fuel component which may be a crude-derived diesel fuel or a biodiesel (also known as a fatty acid methyl ester (FAME) fuel) or a combination thereof. More preferably, the diesel fuel composition is a blend of a distillate fuel component having an aniline point of greater than 80° C. and a crude derived diesel or a biodiesel fuel.

As a result of the levels of aromatic and naphthenic species present in crude-derived diesel fuels, these fuels have aniline points that are less than 75° C., and more typically less than 70° C.

The distillate fuel component will typically be highly paraffinic, i.e. having a paraffinic content of at least 70 weight percent and an aromatics content less than 0.1 weight percent. The highly paraffinic distillate fuel component also has a sulphur content of less than 10 ppm. As used herein the term "paraffin" is defined in accordance with the IUPAC definition as a term that designates acyclic saturated hydrocarbons, which stands in contradistinction to naphthenes.

Such fuels are generally suitable for use in a compression ignition (CI) internal combustion engine, of either the indirect or direct injection type.

The highly paraffinic distillate fuel component suitable for carrying out the present invention may be derived from a Fischer-Tropsch (FT) process, such as those described as GTL (gas-to-liquid) fuels, CTL (coal- to-liquid) fuels, BTL (biomass-to-liquids) and OTL (oil sands-to-liquid) fuels. The direct products of the FT process are usually further refined which will generally include hydrocracking/hydroisomerizing and other hydroprocessing of the heavy waxy material. The boiling range of the resulting highly paraffinic distillate fuel component will be that typical of a diesel fuel, 160-370° C.

The FT process is used industrially to convert synthesis gas, derived from coal, natural gas, biomass or heavy oil streams, into hydrocarbons ranging from methane to species with molecular masses above 1400.

While the main products are linear paraffinic materials, other species such as branched paraffins, olefins and oxygenated components form part of the product slate. The exact product slate depends on reactor configuration, operating conditions and the catalyst that is employed, as is evident from e. g. Catal. Rev.-Sci. Eng., 23 (1 & 2), 265-278 (1981).

Preferred reactors for the production of heavier hydrocarbons are slurry bed or tubular fixed bed reactors, while operating conditions are preferably in the range of 160° C.-280° C., in some cases 210-260° C., and 18-50 Bar, in some cases 20-30 bar. The Low Temperature FT (LTFT) process has been described extensively in the technical literature, for example in "Fischer Tropsch Technology", edited by AP Steynberg and M Dry and published in the series Studies in Surface Science and Catalysis (v.152) by Elsevier (2004). Some of its process features had been disclosed in, for example: U.S. Pat. Nos. 5,599,849, 5,844,006, 6,201,031, 6,265,452 and 6,462,098, all teaching on a "Process for producing liquid and, optionally, gaseous products from gaseous reactants".

Preferred active metals in the FT catalyst comprise iron, ruthenium or cobalt. While each catalyst will give its own unique product slate, in all cases the product slate contains some waxy, highly paraffinic material which needs to be further upgraded into usable products. The products for the FT process can be converted into a range of final products, such as middle distillates, gasoline, solvents, lube oil bases, etc. Such conversion, which usually consists of a range of processes such as hydrocracking, hydrotreatment and distillation, can be termed as FT work-up process.

The FT work-up process of a specific embodiment of the invention uses a feed stream consisting of C5 and higher hydrocarbons derived from a FT process to produce the distillate fuel. This feed is separated into at least two individual fractions, a heavier and at least one lighter fraction. The lighter fraction will typically contain material which falls with the diesel boiling range. The heavier fraction, also referred to as wax, contains a considerable amount of hydrocarbon material which boils higher than the normal diesel boiling range. Therefore heavier material that boils at temperatures of more than 370 C is converted into lighter materials by means of a catalytic process often generally referred to as hydroprocessing, which includes processes such as hydrocracking, hydroisomerisation etc.

Catalysts for hydroprocessing, are of the bifunctional type; i. e. they contain sites active for cracking and for hydrogenation. Catalytic metals active for hydrogenation include group VIII noble metals, such as platinum or palladium, or a sulphided Group VIII base metals, e.g. nickel, cobalt, which may or may not include a sulphided Group VI metal, e. g. molybdenum. The support for the metals can be any refractory oxide, such as silica,alumina, titania, zirconia, vanadia and other Group IV, VA and VI oxides, alone or in combination with other refractory oxides. Alternatively, the support can partly or totally consist of zeolite.

Process conditions for hydrocracking can be varied over a wide range and are usually laboriously chosen after extensive experimentation to optimize the yield (and properties) of the middle distillate product. Table 1 below shows ranges of various process conditions for hydrocracking.

TABLE 1

Process conditions for hydrocracking

| CONDITION | BROAD RANGE | PREFERRED RANGE |
|---|---|---|
| Temperature | 150-450 | 340-400 |
| Pressure | 10-200 | 30-80 |
| Hydrogen flow rate (m³n/m³ feed) | 100-2000 | 800-1600 |
| Conversion of >370° C. material (mass %) | 30-80 | 50-70 |

Alternatively, the highly paraffinic distillate fuel component is hydrogenated renewable diesel (HRD). HRD is a middle distillate range fuel obtained by hydrogenating and decomposing oils derived from plants, animals, and/or fish, which are optionally isomerized. Chemically, it entails catalytic hydrogenation of the oil, where the triglyceride portion is transformed into the corresponding alkane. (The glycerol chain of the triglyceride will also be hydrogenated to the corresponding alkane.) The process removes oxygenates from the oil; and the product is a clear and colourless paraffin that is effectively chemically analogous to GTL diesel. Such a process is for example, disclosed in U.S. Pat. No. 7,279,018 for the manufacture of HRD (hydrogenated renewable diesel). Such distillate fuels typically boil within the range of from 110° C. to 500° C., e.g. 150° C. to 400° C.

Aniline point test (ASTM D611-07)

The aniline point of a fuel is the lowest temperature at which the fuel is completely miscible with an equal amount of aniline. It is therefore a measure of the ability of the fuels ability to keep a polar aromatic (aniline) in solution. As such, it is used in the art as an indicator of the hydrocarbon type distribution within the fuel sample. Fuels that are high in aromatics will be easily miscible with aniline i.e. miscible at lower temperatures; and therefore have a low aniline point value. By contrast, more paraffinic fuels will be less miscible with aniline and hence require a higher temperature in order to ensure miscibility. Typically, comparable naphthenic and olefinic species are observed to be miscible between these two extremes.

The invention will now be illustrated by the following non-limiting examples:

EXAMPLES

Example 1

The resultant aniline point of a blend of two diesel sample fuels with differing initial aniline points was demonstrated using various blends prepared from:
  a commercially available crude-derived diesel sample which conformed to current European EN590 specifications for sulphur free diesel and contained only a lubricity improver additive (This diesel is designated EN590 diesel in the tables and figures); and an FT-derived GTL diesel sample, with a CFPP of around −8° C. (designated GTL diesel in the tables and figures). This GTL diesel fuel is characteristically highly paraffinic and contains negligible aromatic species or sulphur; and has a high resulting cetane number. It also contained a commercial ester-based lubricity improver additive at a level of 225 ppm.

The aniline point of the fuel samples of blends with varied ratios of FT-derived GTL diesel and crude derived EN590 diesel was determined, according to ASTM D611-07, by heating aniline and the test sample above their miscibility temperature. The mixture was cooled until phase separation was observed and the temperature was then recorded.

FIG. 1 shows the aniline points measured for this range of blends.

Example 2

The extent of zinc pick-up for a variety of diesel samples (and blends thereof) with a range of resulting aniline points was then assessed with time. The base diesel sample fuels assessed were the EN590 and GTL diesel fuel samples described in Example 1; and a biodiesel rapeseed methyl ester (RME) sample complying with EN 14214 specifications.

The zinc pick-up for the neat sample fuels and certain blends thereof was assessed using a powder exposure method, adapted from Leedham et al. 20 g zinc powder 99%, Sigma Aldrich, St Louis, Mich.) was added to 800 g of the diesel sample fuels (or sample blends).

The fuels and zinc powder were thoroughly mixed by inverting the sample bottles and shaking several times. Weekly 50 mL aliquots were drawn from the top of the samples and filtered through a 1.20 µm Minisart syringe filter (Sigma Aldrich, St Louis, Mich.) to remove any stray zinc powder. The aliquots were analysed for zinc using ICP-AES. After each weekly aliquot was drawn, the fuels were again inverted and shaken. Weekly aliquots were drawn for 6 weeks.

The samples investigated using this methodology were therefore a neat EN590 compliant crude-derived diesel sample, a neat GTL diesel having an aniline point of 95.5° C., a neat RME biodiesel; an 80:20 vol % GTL:EN590 blend, a 20:80 vol % GTL:EN590 blend; and a 93:7 vol % GTL:RME (Rapeseed methyl ester) blend.

Figure 2:
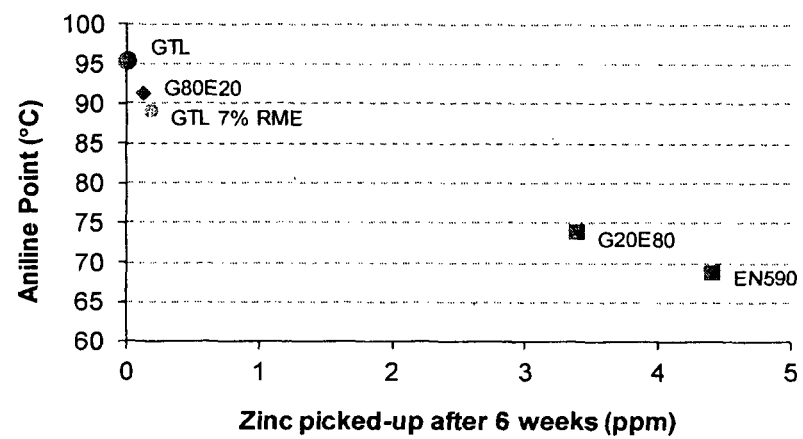
FIG. 2 shows the zinc pick-up after a 6 week period for samples of Example 2 exposed to zinc powder, together with the aniline point values for each of the blends.

FIG. 2 shows the zinc pick-up after a 6 weeks period for those samples exposed to zinc powder, together with the aniline point values for each of the blends. Table 2 below also shows these values.

Figure 3:
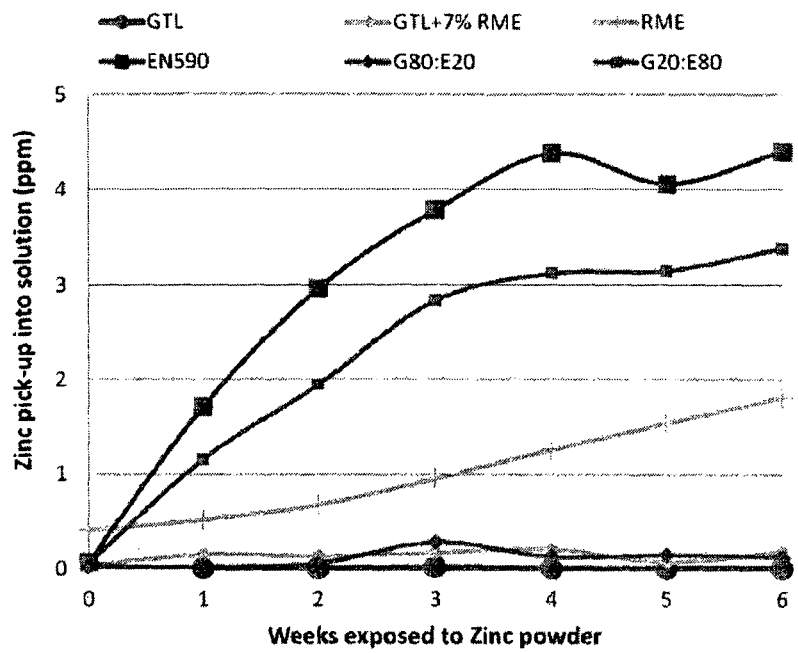
FIG. 3 shows the extent of the zinc pick-up for the samples of Example 2 as a function of time over a 6 week period.

FIG. 3 shows the extent of the zinc pick-up for these samples as a function of time over the 6 week period.

TABLE 2

| | | Zn concentration (ppm) | |
|---|---|---|---|
| Test Fuel | Aniline point (° C.) | Initial levels measured | After exposure to Zn powder for 6 weeks |
| EN590 diesel | 68.9 | below 15 ppb detection limit | 4.4 |
| GTL diesel | 95.5 | below 15 ppb detection limit | below 15 ppb detection limit |
| 80:20 vol % (GTL:EN590) | 91.4 | below 15 ppb detection limit | 0.12 |
| 20:80 vol % (GTL:EN590) | 74 | below 15 ppb detection limit | 3.38 |
| RME | <20 | 0.403 | 1.81 |

TABLE 2-continued

| | | Zn concentration (ppm) | |
|---|---|---|---|
| Test Fuel | Aniline point (° C.) | Initial levels measured | After exposure to Zn powder for 6 weeks |
| 93:7 vol % (GTL:RME) | 89.2 | 0.02821 | 0.18 |

Example 3

A test rig was designed and built to resemble a typical market-related pipeline system. The system was constructed using standard ½" galvanised pipe fittings and pipe. All components were hot-dip galvanised inside and out. The system was fitted with a conventional automotive fuel pump and a pressure regulating system. The test procedure involved circulating the fuel in the system at 3 bar from a 10 L steel drum for a period of 3 weeks running continuously. Samples were drawn shortly after start-up and then weekly thereafter. They were analysed for zinc using ICP-AES. The rig was first run in for 3 weeks on EN590 diesel sample fuel to clear the rig of any loose galvanized zinc before quantitative zinc pick-up experiments could begin.

Figure 4:
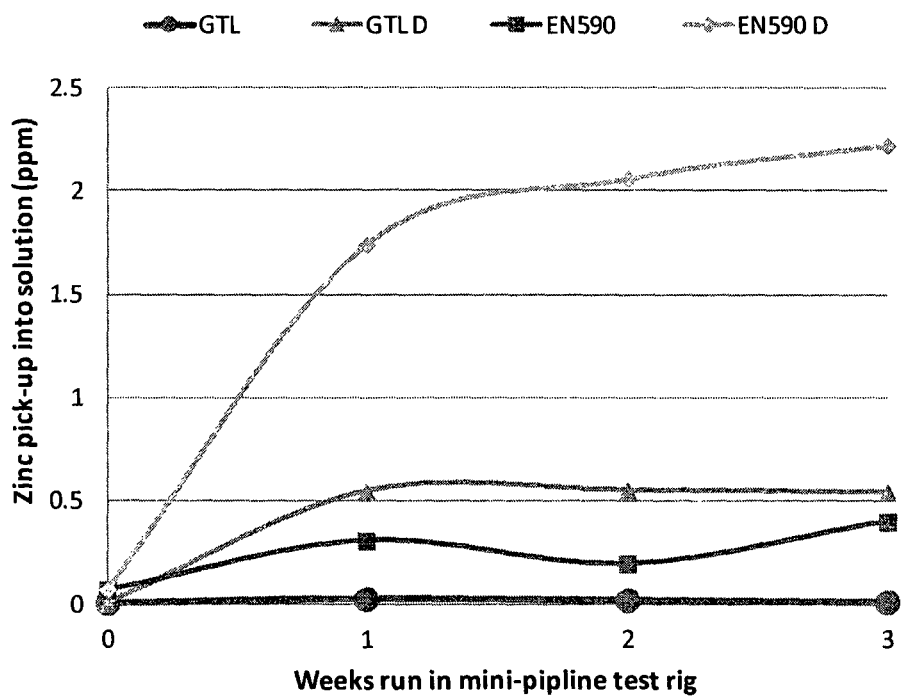
FIG. 4 shows the zinc pick-up behavior of four different diesel fuel samples assessed by the method of Example 3.

The zinc pick-up behaviour of 4 different diesel fuel samples was assessed using this test method. Neat EN590-compliant and GTL diesel sample fuels (as described in Example 1) were tested, together with samples of each diesel fuel that had been doped with a commercial deposit control additive (at a level of 390 ppm). The results of this test are presented in FIG. 4 and Table 3.

As observed in Example 2, the fuel characterised by the lower aniline point value (the EN590-compliant diesel sample) exhibits increased levels of zinc contamination when exposed to a zinc-containing (galvanised) pipeline system, whereas the GTL diesel sample, characterised by a high aniline point, exhibited negligible zinc up-take over the same time periods.

The addition of a deposit control additive was unsurprisingly observed to increase the levels of zinc in the case of both the neat EN590-compliant diesel and GTL diesel sample fuels. However, in the case of the GTL diesel sample, the final zinc levels observed were significantly reduced when compared to those of the EN590-compliant sample; and were of comparable levels to the uptake observed for the unadditised EN590-compliant diesel sample.

TABLE 3

| | | Zn concentration (ppm) | |
|---|---|---|---|
| Test Fuel | Aniline point (° C.) | Initial levels measured | After exposure to galvanised test pipeline for 3 weeks |
| EN590 diesel | 68.9 | 0.071 | 0.399 |
| EN590D diesel (with commercial deposit control additive) | | 0.071 | 2.23 |
| GTL diesel | 95.5 | below 15 ppb detection limit | below 15 ppb detection limit |
| GTLD diesel (with commercial deposit control additive) | | below 15 ppb detection limit | 0.541 |

Example 4

The extent of zinc pick-up for blends of an alternative commercially available low sulphur crude-derived diesel sample (designated Crude1) with a highly paraffinic GTL diesel sample fuel was determined according to the methodology described in Example 2. Indicated below in Table 4 are the aniline points for the neat diesel fuel samples and intermediate blends; and the zinc levels determined after exposure to zinc powder for a period of 1 week.

TABLE 4

| Blend % of GTL diesel | Blend % of Crude 1 | Aniline point (° C.) | Zn concentration after exposure to zinc powder after 1 week (ppm) |
|---|---|---|---|
| 100 | 0 | 95.1 | NR |
| 90 | 10 | 92.3 | 0.186 |
| 80 | 20 | 90.1 | 0.209 |
| 70 | 30 | 87.9 | 0.66 |
| 50 | 50 | 81.9 | 0.72 |
| 20 | 80 | 75.0 | 1.15 |
| 0 | 100 | 70.8 | 3.687 |

Figure 5:
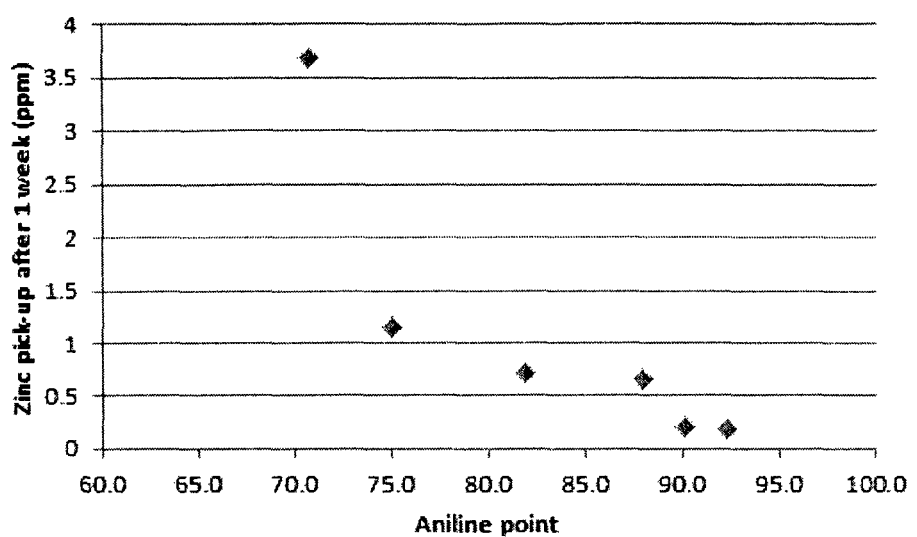
FIG. 5 shows the zinc pick-up observed in the tests of Example 4 as a function of aniline point.

FIG. 5 shows the zinc pick-up observed in these tests as a function of aniline point. It can be clearly observed that fuel samples having an aniline point greater than 80° C. demonstrate a zinc pick-up rate that is lower than those that have an aniline point lower than 80° C.

The invention claimed is:

1. A method for reducing a propensity of a diesel fuel composition to take up zinc when exposed to zinc during storage and/or transportation, comprising:
   formulating a diesel fuel composition having an aniline point greater than 80° C., wherein the diesel fuel formulation is configured to be stored and/or transported in contact with zinc, wherein the diesel fuel composition is configured to have a zinc content of less than 15 ppb following exposure to zinc.

2. The method of claim 1, wherein the diesel fuel composition comprises a distillate fuel component which is highly paraffinic.

3. The method of claim 1, wherein formulating the diesel fuel composition comprises blending a highly paraffinic distillate fuel component with a second distillate fuel component in an effective amount to yield the diesel fuel composition having the aniline point greater than 80° C.

4. The method of claim 3, wherein the highly paraffinic distillate fuel component has a paraffin content of at least 70 weight %.

5. The method of claim 3, wherein the highly paraffinic distillate fuel component has an aromatics content less than 0.1 weight % and a sulfur content less than 10 ppm.

6. The method of claim 3, wherein the highly paraffinic distillate fuel component is derived from a process selected from the group consisting of a Fischer-Tropsch process, a hydrogenated renewable diesel process, and a combination thereof.

7. The method of claim 3, wherein the second distillate fuel component is selected from the group consisting of a crude-derived distillate fraction, a bio-derived fuel fraction, and a combination thereof.

8. The method of claim 1, further comprising adding a deposit control additive to the diesel fuel composition in an amount greater than 200 ppm, and wherein the diesel fuel composition comprising the deposit control additive is configured to have a zinc content of less than 1 ppm following exposure to zinc.

9. The method of claim 1, further comprising adding a deposit control additive to the diesel fuel composition in an amount greater than 350 ppm, and wherein the diesel fuel composition comprising the deposit control additive is configured to have a zinc content of less than 1 ppm following exposure to zinc.

10. A method of storing and/or transporting a diesel fuel, comprising:
    contacting a diesel fuel composition having an aniline point greater than 80° C. with zinc during storage and/or transportation, wherein zinc up-take by the diesel fuel composition is less than 15 ppb following exposure to zinc.

11. The method of claim 10, wherein the diesel fuel composition comprises a distillate fuel component which is highly paraffinic.

12. The method of claim 10, wherein the diesel fuel composition comprises a blend of a highly paraffinic distillate fuel component with a second distillate fuel component, wherein the highly paraffinic distillate fuel component has a paraffin content of at least 70 weight %.

13. The method of claim 2, wherein the highly paraffinic distillate fuel component has an aniline point greater than 80° C.

14. The method of claim 1, wherein the diesel fuel composition has an aniline point greater than 95° C.

15. A method for preparing a diesel fuel composition with a reduced propensity to take up zinc when exposed to zinc during storage and/or transportation, comprising:
    providing a highly paraffinic distillate fuel component having a paraffin content of at least 90% by weight, an aromatics content less than 0.1 weight percent, a sulfur content less than 10 ppm, and an aniline point of greater than 95° C.;
    providing a second distillate fuel component having an aniline point of 75° C. or less; and
    blending the highly paraffinic distillate fuel component with the second distillate fuel component in an effective amount to yield a diesel fuel composition having an aniline point greater than 95° C., wherein the diesel fuel composition is configured to have a zinc content of less than 15 ppb following exposure to zinc.

* * * * *

UNITED STATES PATENT AND TRADEMARK OFFICE
CERTIFICATE OF CORRECTION

PATENT NO. : 9,944,870 B2
APPLICATION NO. : 14/438871
DATED : April 17, 2018
INVENTOR(S) : Christopher Woolard Page 1 of 1

It is certified that error appears in the above-identified patent and that said Letters Patent is hereby corrected as shown below:

In the Specification

Column 6 Line 2, After "Group" insert --III--.

Column 7 Line 29, After "powder" insert --($\geq$--.

Signed and Sealed this
Tenth Day of July, 2018

Andrei Iancu
*Director of the United States Patent and Trademark Office*